United States Patent
Kobayashi et al.

(10) Patent No.: US 7,043,615 B1
(45) Date of Patent: May 9, 2006

(54) NONVOLATILE SEMICONDUCTOR MEMORY AND METHOD OF MANAGING INFORMATION IN INFORMATION DISTRIBUTION SYSTEM

(75) Inventors: Naoki Kobayashi, Tokyo (JP); Yuji Satou, Machida (JP); Hideaki Kurata, Kokubunji (JP); Kunihiro Katayama, Chigasaki (JP); Takayuki Kawahara, Higashiyamato (JP)

(73) Assignee: Renesas Technology Corp., Tokyo (JP)

( * ) Notice: Subject to any disclaimer, the term of this patent is extended or adjusted under 35 U.S.C. 154(b) by 135 days.

(21) Appl. No.: 10/276,664

(22) PCT Filed: Jun. 2, 2000

(86) PCT No.: PCT/JP00/03601

§ 371 (c)(1),
(2), (4) Date: Nov. 19, 2002

(87) PCT Pub. No.: WO01/95115

PCT Pub. Date: Dec. 13, 2001

(51) Int. Cl.
*G06F 12/00* (2006.01)

(52) U.S. Cl. .................. 711/163; 711/103; 711/164
(58) Field of Classification Search ............... 711/152, 711/163; 710/107–108, 200, 240–244; 714/763, 714/805; 705/18; 713/182–189, 200–202
See application file for complete search history.

(56) References Cited

U.S. PATENT DOCUMENTS 5,293,424 A * 3/1994 Holtey et al. ............... 713/193
5,491,827 A * 2/1996 Holtey ....................... 711/163

FOREIGN PATENT DOCUMENTS

JP 8-506915 7/1996
JP 2000-50047 2/2000

* cited by examiner

*Primary Examiner*—Nasser Moazzami
(74) *Attorney, Agent, or Firm*—Miles & Stockbridge P.C.

(57) ABSTRACT

There is provided semiconductor memory capable of reconfiguring an area to be given an authentication key and access limitation, and there is implemented an information distribution system having an advanced security function using the semiconductor memory.

Part of a storage area in the semiconductor memory stores information about the area to be given the authentication key and the access limitation. Alternatively, the authentication key is stored in units of data to be authenticated for limiting an access to stored information. Information is protected doubly by storing encrypted information in the area provided with the access limitation according to the above-mentioned method.

2 Claims, 22 Drawing Sheets

| ACCL1 | PERMITTED ACCESS |
|---|---|
| 000 | NO ACCESS |
| 001 | READ |
| 010 | SPARE |
| 011 | READ/WRITE |
| 100 | ERASE |
| 101 | ERASE/READ |
| 110 | SPARE |
| 111 | FULL ACCESS |

| ACCESS | ACCL |
|---|---|
| READ | 001 |
| ERASE | 100 |
| WRITE | 011 |
| REWRITE | 111 |

FIG. 8A
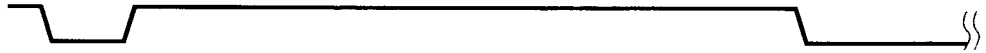
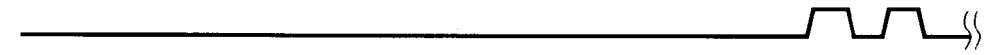
DATA INPUT
DATA INPUT     READ START
FIG. 8B
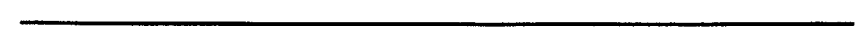
ERASE START

ADDRESS

|  | ADDRESS INFORMATION | STORED AUTHENTICATION KEY | PERMITTED ACCESS |
|---|---|---|---|
| AREA 1 | A0~A3 | K1 (AUTHENTICATION KEY SET BY PROVIDER) | READ |
| AREA 2 | A1~A2 | K2 (AUTHENTICATION KEY SET BY USER) | NO |

FIG. 19A
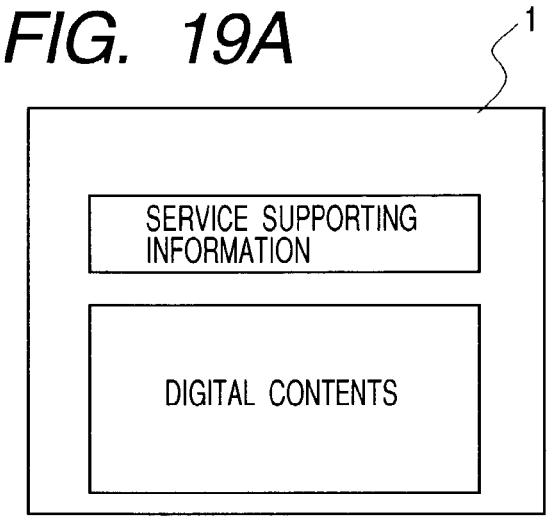
FIG. 19B
|  | ACCESS LIMITATION | ENCRYPTION |
|---|---|---|
| SERVICE SUPPORTING INFORMATION | YES (DISTRIBUTION TERMINAL INPUT AUTHENTICATION KEY) | YES (USER INPUT CIPHER KEY) |
| DIGITAL CONTENTS | NO | YES |
FIG. 19C
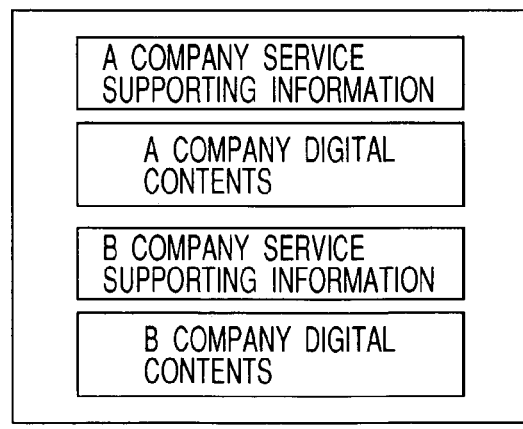

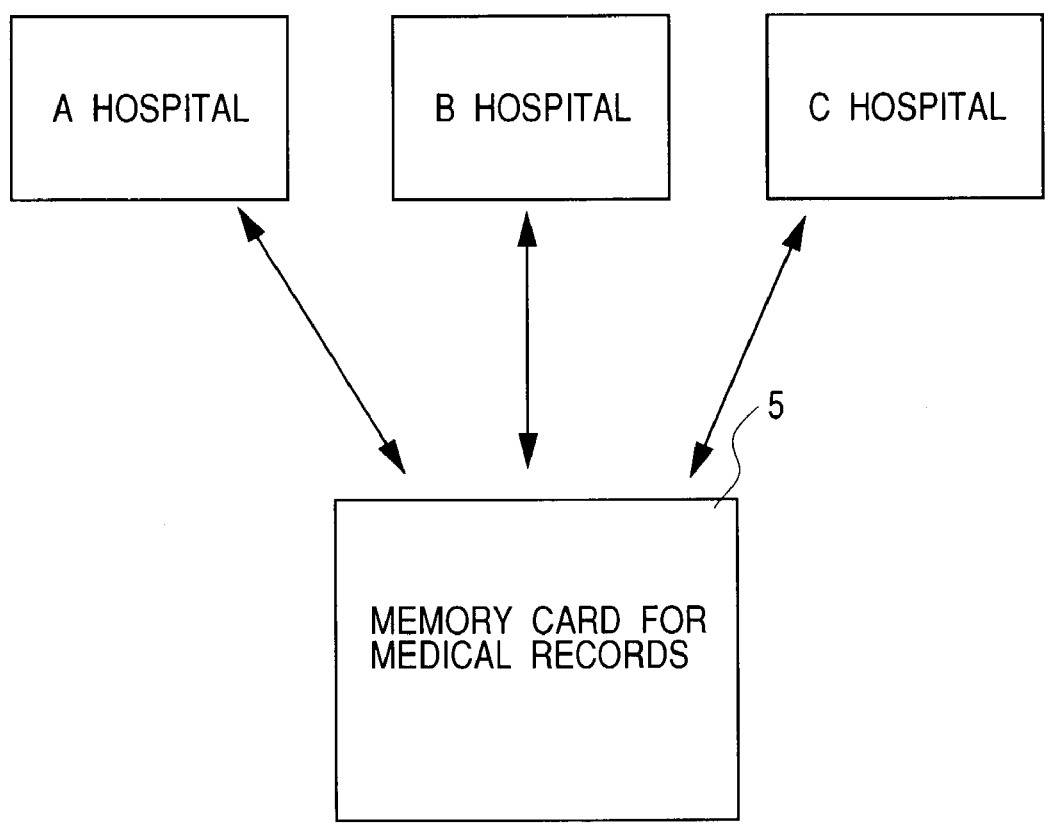

FIG. 22A

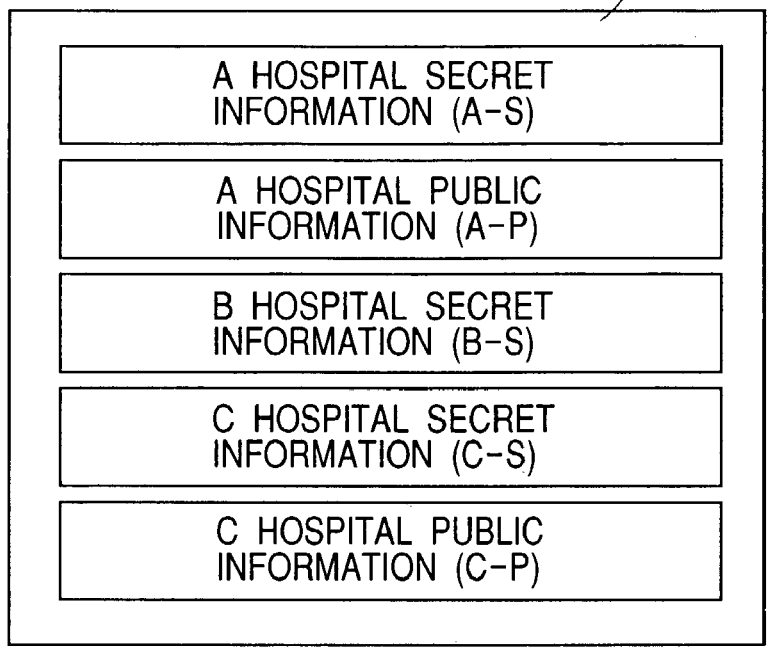

- A HOSPITAL SECRET INFORMATION (A-S)
- A HOSPITAL PUBLIC INFORMATION (A-P)
- B HOSPITAL SECRET INFORMATION (B-S)
- C HOSPITAL SECRET INFORMATION (C-S)
- C HOSPITAL PUBLIC INFORMATION (C-P)

FIG. 22B

|     | ACCESS LIMITATION (READ ONLY)              | ENCRYPTION                            |
| --- | ------------------------------------------ | ------------------------------------- |
| A-S | YES (A HOSPITAL INPUT AUTHENTICATION KEY)  | YES (A HOSPITAL INPUT CIPHER KEY)     |
| A-P | YES (A HOSPITAL INPUT AUTHENTICATION KEY)  | NO                                    |
| B-S | YES (B HOSPITAL INPUT AUTHENTICATION KEY)  | YES (B HOSPITAL INPUT CIPHER KEY)     |
| C-S | YES (C HOSPITAL INPUT AUTHENTICATION KEY)  | YES (B HOSPITAL INPUT CIPHER KEY)     |
| C-P | YES (C HOSPITAL INPUT AUTHENTICATION KEY)  | NO                                    |

NONVOLATILE SEMICONDUCTOR MEMORY AND METHOD OF MANAGING INFORMATION IN INFORMATION DISTRIBUTION SYSTEM

TECHNICAL FIELD

The present invention relates to an information memory having an access limitation function and an information system using such memory. More particularly, the present invention relates to a technology effectively applicable to a nonvolatile memory typified by a flash memory, a memory card containing the nonvolatile memory, and an information distribution system using these storage devices.

BACKGROUND ART

In the recent information-intensive society, there is an increasing demand for ensuring the security of information stored in a memory card or a memory chip (limiting an access to read) or preventing a third party from illegally rewriting or erasing data (limiting an access to write or erase).

As means for protecting stored information, there are known the method of storing a password in ROM of the memory card and permitting an access when the memory card is supplied with an input matching the password and the method of encrypting information to be stored, etc.

DISCLOSURE OF INVENTION

However, the above-mentioned method of using a password stored in ROM has a limited capability of using a predetermined area or password for providing an access limitation. It is difficult to provide versatile capabilities suited for the highly advanced information-oriented society.

The above-mentioned method of encrypting information to be stored makes it difficult to prevent a third party from erasing information or writing different data after erasing the original data.

The present invention has been made in consideration of the foregoing. It is therefore an object of the present invention to provide an information memory and a semiconductor memory capable of protecting stored information against an illegal access from a third party and ensuring a high degree of freedom for information protection setting. It is another object of the present invention to provide an information system using these devices.

These and other objects and novel features of the invention may be readily ascertained by referring to the following description and appended drawings.

The following summarizes representative aspects of the invention disclosed in this application.

According to one aspect of the present invention, there is provided a nonvolatile semiconductor memory comprising: a memory cell array containing a plurality of nonvolatile memory cells; a decoder driver to select a nonvolatile memory cell addressed from the memory cell array; and an access control circuit supplied with an input command and input address, wherein the access control circuit compares access control information about an access control area limiting a specified access in the memory cell array with the input command and the input address supplied to the access control circuit, provides control to select a nonvolatile memory cell specified by the input address via the decoder driver when the input command and the input address do not comply with an access limited for the address control area, and provides control not to select a nonvolatile memory cell specified by the input address via the decoder driver when the input command and the input address comply with an access limited for the address control area; the access control information includes address information about an access-limited area and a limited access mode; and information included in the access control information is specifiable by means of a command. By using such nonvolatile semiconductor memory, not only a semiconductor manufacturer, but also a provider and a user can freely limit accesses, thus providing a memory card with flexible security.

According to another aspect of the present invention, there is provided a nonvolatile semiconductor memory comprising: a memory cell array containing a plurality of nonvolatile memory cells; a decoder driver to select a nonvolatile memory cell addressed from the memory cell array; and an access control circuit supplied with an input command, an input address and an input key, wherein a specified area in the memory cell array is an access limitation area limiting a specified access and stores access control information including an access mode limited for the access limitation area and a first key; the access control circuit compares the access control information with the input command, the input address, and the input key, provides control to select a nonvolatile memory cell specified by the input address via the decoder driver when the input key matches the first key or the input command and the input address do not comply with an access limited for the address control area, and provides control not to select a nonvolatile memory cell specified by the input address via the decoder driver when the input key does not match the first key and the input command and the input address comply with an access limited for the address control area; and the access limitation area stores data encrypted with a second key. In this manner, it is possible to strengthen the security by using the two keys for security. One key may be used as an authentication key. The other may be used as a cipher key. Alternatively, the two keys maybe used as authentication keys.

According to still another aspect of the present invention, there is provided a method of managing information for writing and storing information in a memory card implementing the above-mentioned nonvolatile memory function, comprising the steps of: writing information of a first access management level to a first area of memory in the memory card; and writing information of a second access management level to a second area of the memory in the memory card, the second access management level being lower than the first access management level, wherein a first key limits access to the first area and the second area by others than a person who sets up the first key; and information encrypted by a second key is written to the first area and information without the encryption is written to the second area.

BRIEF DESCRIPTION OF DRAWINGS

FIG. 8A is a timing chart showing a procedure of write accesses in the nonvolatile semiconductor memory according to the present invention;

FIG. 8B is a timing chart showing a procedure of erase accesses in the nonvolatile semiconductor memory according to the present invention;

FIG. 19A diagrams information stored in the memory card used for an example of the information distribution system according to the present invention;

FIG. 19B diagrams information stored in the service supporting information storage area and a digital contents storage area;

FIG. 19C exemplifies storing digital contents information from a plurality of providers in the memory card;

FIG. 21 is a block diagram showing an example of an information sharing system according to the present invention;

FIG. 22A exemplifies information stored in the memory card used for an example of the information sharing system according to the present invention; and FIG. 22B exemplifies access limitations on the memory card used for an example of the information sharing system according to the present invention.

BEST MODE FOR CARRYING OUT THE INVENTION

The following shows concrete examples of the present invention. The description below chiefly focuses on examples of applying the present invention to a flash memory or a memory card using the same. Not limited thereto, the present invention is operative using general storage means including a nonvolatile memory such as ferroelectric memory (FRAM), magnetic memory (MRAM), etc. and volatile memory such as power-supplied DRAM, SRAM, etc. The flash memory used in the examples below can be multilevel memory capable of storing 2-bit or more information in one memory cell.

First Embodiment

Figure 1:
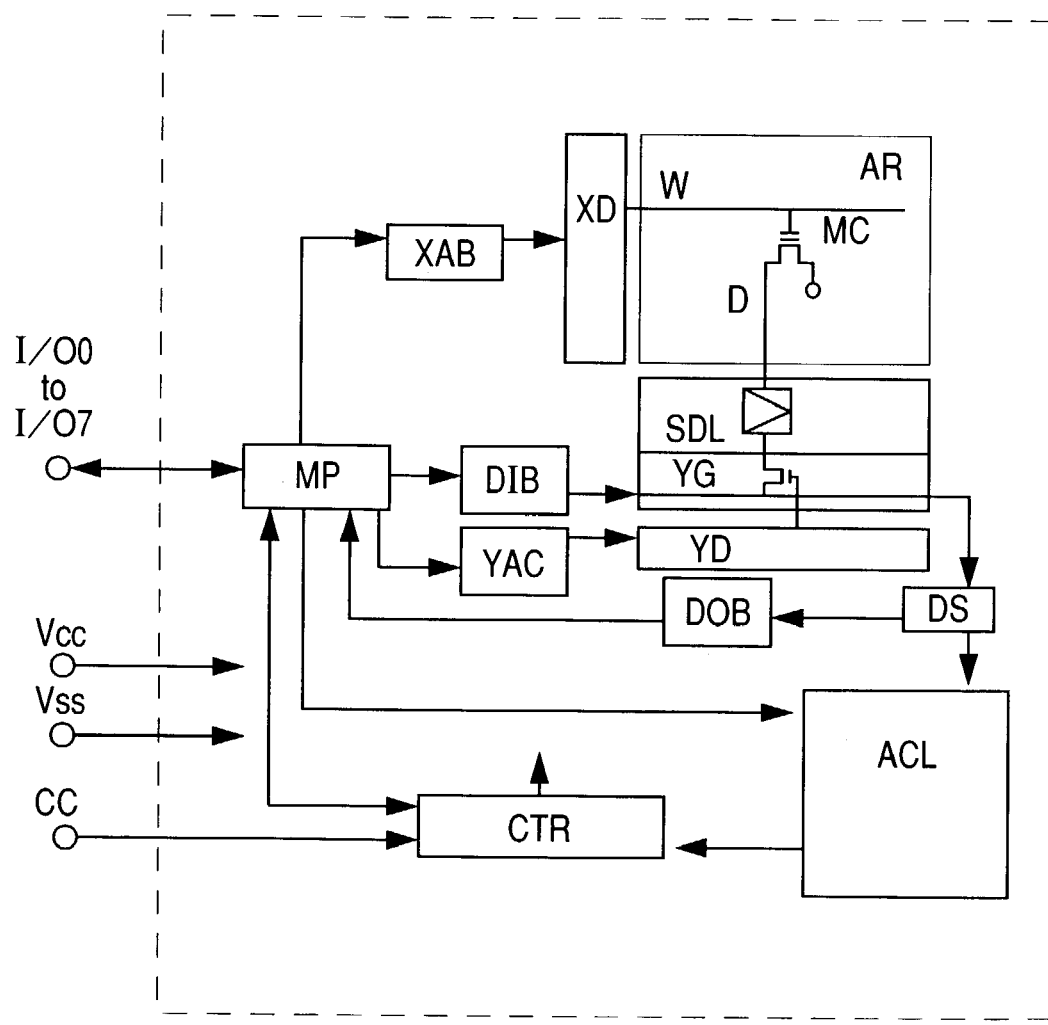
FIG. 1 is a block diagram showing an example of a nonvolatile semiconductor memory according to the present invention.

FIG. 1 is a block diagram of the flash memory as the first embodiment of the present invention. Via input/output terminals I/O0 to I/O7, the flash memory is supplied with signals such as addresses, commands, data, input authentication keys, etc. and outputs signals such as data, status, etc. A control signal terminal CC supplies various control signals from the outside. The control signal terminal CC collectively represents terminals for various control signals including a command data enable signal, a write enable signal, etc. A first operation potential Vcc and a second operation potential Vss are supplied from the outside. An internal boosting circuit (not shown) generates high voltage needed for writing.

A multiplexer circuit MP is connected to an input/output terminal I/O, distributes an input signal, and transmits an output signal from each unit to the input/output terminal I/O. A control unit CTR is connected to various control signal terminals CC and generates control signals for operations such as reading, erasing, writing, and rewriting. A memory array AR is provided with a memory cell MC at each intersecting point between a plurality of word lines W and a plurality of bit lines D. For simplicity, FIG. 1 just shows one word line W, one bit line D, and one memory cell MC. The memory array AR can have any configuration. Data written to the memory array AR is input via a data input buffer circuit DIB. Data read from the memory array AR is output via a data output buffer circuit DOB. Each bit line connects with a register (a component of a sense circuit and a data register circuit SDL). Each register circuit latches data to be written to or read from the memory array AR.

Of input address signals, an X address is input to an X address decoder circuit XD via an X address buffer circuit XAB. The X address decoder circuit XD decodes the X address to select a corresponding word line W in the memory array AR. Of input address signals, an initial value of a Y address is input to a Y address counter circuit YAC. The Y address counter circuit YAC successively generates Y address signals. A Y address decoder circuit YD decodes the generated Y address to select a corresponding bit line in the memory array AR. A Y gate YG corresponding to the selected bit line becomes ON state. Data is interchanged between the register and the data input buffer circuit DIB or the data output buffer circuit DOB.

The flash memory further comprises an access right check circuit ACL to perform an access right check to be described later, and a data selection unit DS to selectively transmit part of data stored in the memory array AR to the access right check circuit ACL, and the like.

While the X address decoder circuit XD can select any number of word lines W, the flash memory may be configured to always allow one word line W to be selectable. Alternatively, the flash memory may be configured to be capable of selecting one word line during a data read or write operation and simultaneously selecting a plurality of word lines during an erase operation. Further, when there is available a plurality of independently operable banks, the flash memory may be configured to be capable of selecting one word line at a time from each bank during a read or write operation.

While the Y address decoder circuit YD can select any number of bit lines D, the flash memory may be configured to select as many bit lines as appropriate to the bus width of an internal data bus.

Figure 10A:
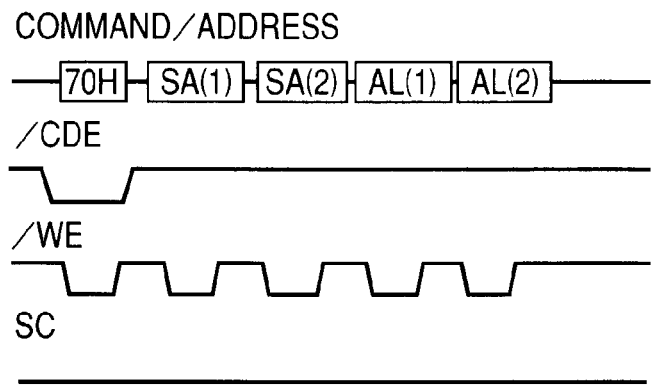
FIG. 10A is a timing chart showing a procedure of setting an access limitation area in the nonvolatile semiconductor memory according to the present invention.
Figure 10B:
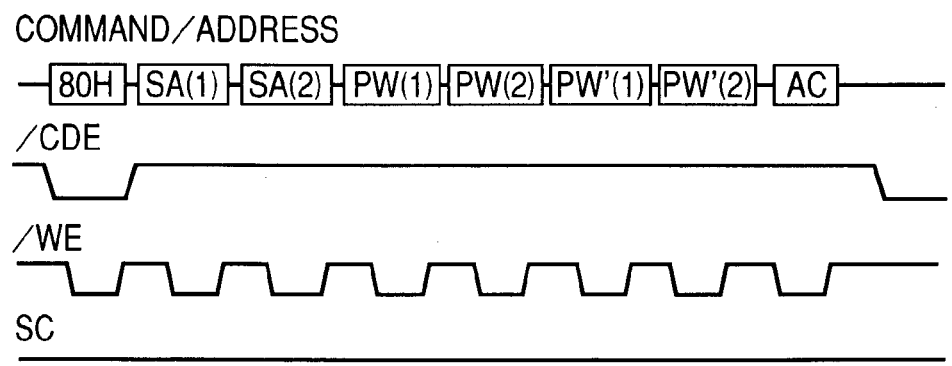
FIG. 10B is a timing chart showing a procedure of changing an authentication key in the nonvolatile semiconductor memory according to the present invention.
Figure 10C:
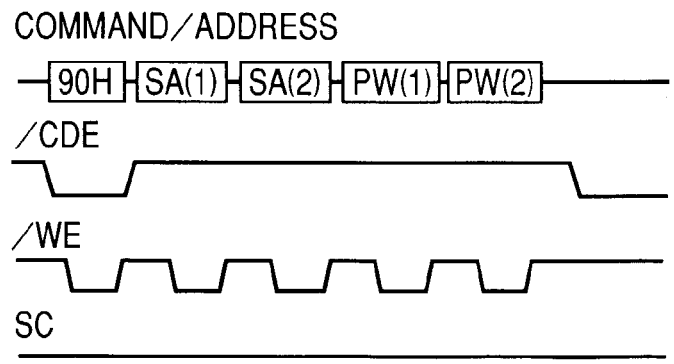
FIG. 10C is a timing chart showing a procedure of releasing the access limitation area in the nonvolatile semiconductor memory according to the present invention.

According to the present invention, the flash memory in FIG. 1 is configured to allow a user to provide any memory space with an access limitation. FIG. 10 (A) exemplifies a signal input operation from the outside in order to set an area to be provided with an access limitation. First, command "70H" is input to notify the input/output terminal I/O of the area setup. When the command "70H" is input, a command data enable signal /CDE supplied from the control signal terminal CC becomes low. The command data enable signal /CDE is used synchronously with the command input timing for identification between a command or data and an address or for prevention of an incorrect operation. A first X to set the area address is input as SA(1) and SA(2) in two blocks. Then, the length of the set area is input as AL(1) and AL(2) in two blocks. Whether or not to input information in two blocks depends on the number of bits for these pieces of information and the number of bits simultaneously input and configured in the flash memory (the number of input/output terminals I/O). A write enable signal /WE indicates a separation between these pieces of information.

In this manner, an access limitation is enabled for the area specified by the input first X address and the area length. Here, an authentication key is assumed to be set to a predetermined default value.

The user specifies a specific authentication key for the specified access limitation area. Even if the authentication fails through the use of this specific authentication key, the area is configured to allow or disallow only a specified access. For example, the above-mentioned procedure of setting the access limitation area sets the authentication key to a default value and provides initialization so that all access modes are available even if the authentication fails. FIG. 10 (B) exemplifies a signal input operation for this purpose. First, command "80H" is input to notify the input/output terminal I/O to change access limitation information. Then, to specify an area concerned, the first X address of the access limitation area is input as SA(1) and SA(2) in two blocks. The authentication key is input as PW(1) and PW(2) in two blocks. An authentication key to be newly changed is input as PW*(1) and PW*(2) in two blocks. The command is then followed by information AC about an access to be permitted when the authentication fails. In this manner, the command changes the authentication key and the permitted access for the specified area.

It is also possible to release the access limitation for the already defined access limitation area. FIG. 10 (C) exemplifies a signal input operation for this purpose. First, command "90H" is input to notify the input/output terminal I/O to release the access limitation. Then, to specify an area in which access limitation is released, the first X address of the access limitation area is input as SA(1) and SA(2) in two blocks. The authentication key is input as PW(1) and PW(2) in two blocks. In this manner, the command erases information about the specified area and releases the access limitation.

Figure 7:
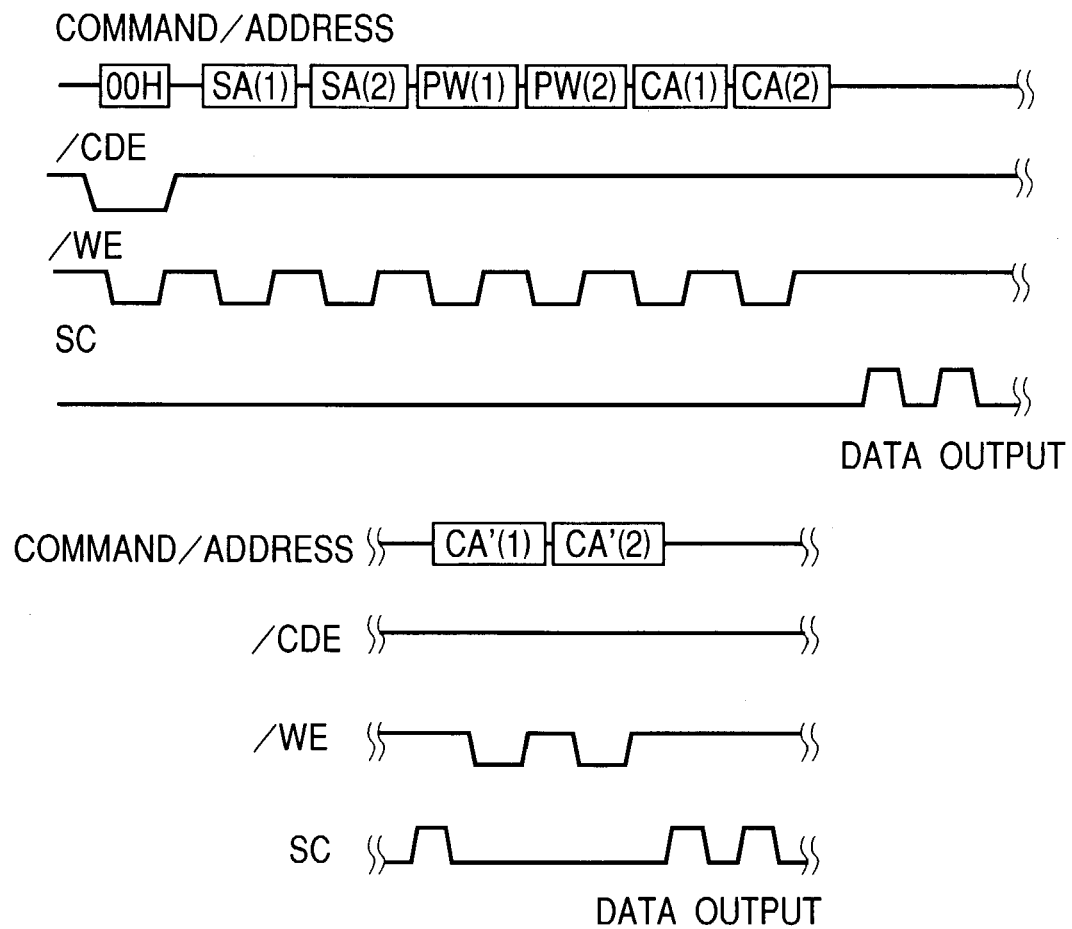
FIG. 7 is a timing chart showing a procedure of read accesses in the nonvolatile semiconductor memory according to the present invention.

FIGS. 7 and 8 exemplify signal input operations from the outside for accessing data in the access-limited flash memory. FIG. 7 shows a data read operation. First, the operation inputs command "00H" to notify the input/output terminal I/O to perform a read operation. Then, the operation supplies SA(1) and SA(2) in two blocks to specify an X address of the memory cell AR that stores data to be read. The operation then supplies PW(1) an PW(2) in two blocks to specify an input authentication key. Further, the operation supplies CA(1) an CA(2) in two blocks to specify the Y address of the memory cell that stores data to be read.

Thereafter, a serial clock SC is driven. The input/output terminal I/O outputs data stored at the specified address. Values in the Y address counter circuit YAC are serially changed to select the bit lines D one by one. It is possible to once stop the serial clock SC, newly input the Y address as CA'(1) and CA'(2) in two blocks, and restart the serial clock SC. In this case, the input/output terminal I/O outputs data from the newly specified Y address. When, depending on a memory chip structure (not shown), a specified time may be required until the memory chip is ready for data output after the Y address is input, it may be preferable to add a wait operation for the specified time or to use a chip's ready/busy signal output to monitor the state and drive the serial clock SC after data output becomes ready.

When another word line W is to be selected, the read operation inputs new command "00H" and the addresses.

FIG. 8 (A) shows a data write operation. First, the operation inputs command "10H" to notify the input/output terminal I/O to write data. The operation supplies SA(1) and SA(2) in two blocks to specify the X address in the memory cell for writing data. The operation supplies PW(1) and PW(2) in two blocks to specify the input authentication key. The operation further supplies CA(1) and CA(2) in two blocks to specify the Y address in the memory cell for writing data. By driving the serial clock SC, the input/output terminal I/O inputs the write data. The data register in the memory chip temporarily stores the write data corresponding the memory cell at and after the specified Y address. It is possible to once stop the serial clock SC, newly input the Y address as CA'(1) and CA'(2) in two blocks, and restart the serial clock SC. In this case, the serial clock SC is driven and the write data is input to temporarily store the write data from the newly specified Y address in the data register. Lastly, after the specified write data is stored in the data register, by inputting command "40H", data temporarily stored in the data register are written to the memory cell.

FIG. 8 (B) shows a data erase operation. First, the operation inputs command "20H" to notify the input/output terminal I/O to erase data. The operation supplies SA(1) and SA(2) in two blocks to specify the X address in the memory cell for erasing data. The operation supplies PW(1) and PW(2) in two blocks to specify the input authentication key.

Lastly, the operation inputs command "BOH" to start erasing. While the example shows erasing of data at a time in the memory cell at the same X address, it may be also preferable to erase data at a time for memory cells constituting a block including a plurality of word lines W.

There may be cases where successive accesses are made to an area assigned with the same input authentication key, or the default input authentication key isused. In these cases, it is to be distinctly understood that various changes and modifications may be made in the present invention without departing from the spirit and scope thereof in such a manner as omitting the input authentication key, changing the order of inputting the X address, the input authentication key, the Y address, and the like, and changing the number of input separations, necessary input items, and the like.

Figure 9A:
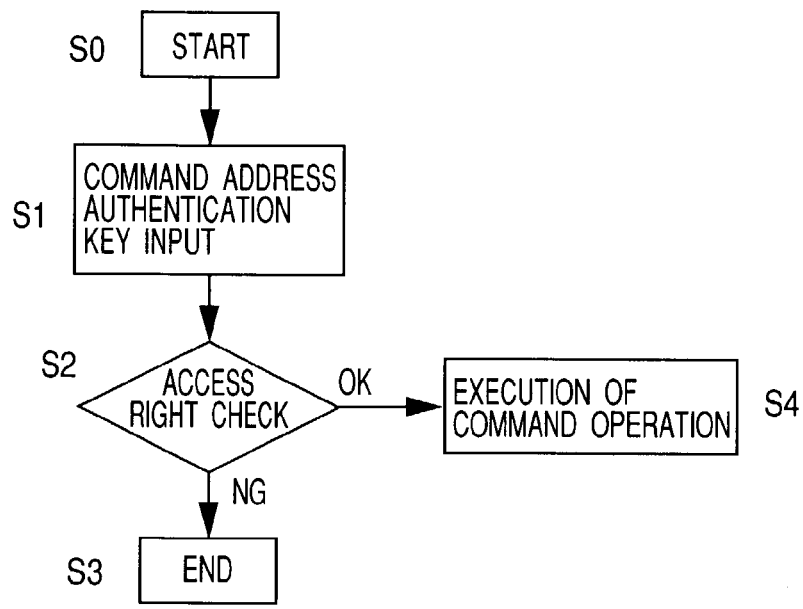
FIG. 9A is a flowchart showing a read operation in the nonvolatile semiconductor memory according to the present invention.
Figure 9B:
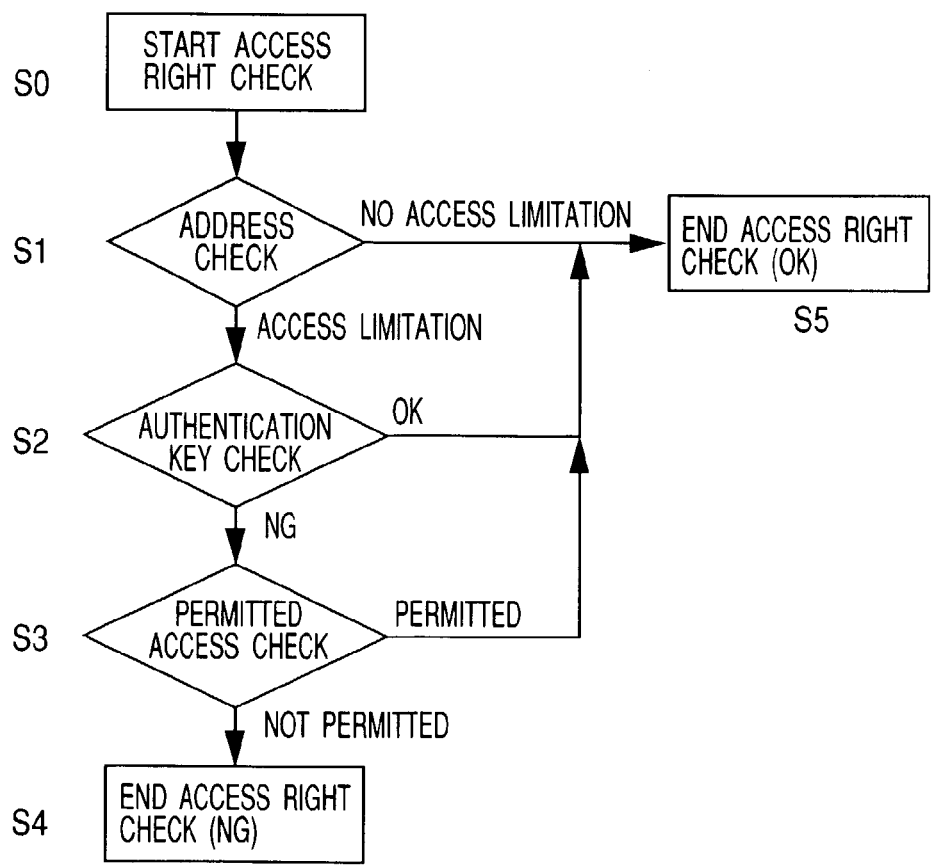
FIG. 9B is a flowchart showing an access right check operation in the nonvolatile semiconductor memory according to the present invention.

FIGS. 9 (A) and (B) exemplify memory chip operations of reading, writing, and erasing data. A command, an address, and an input authentication key are input from the outside (S1). The memory chip checks the access right and also confirms the rightness of the inputted input authentication key (S2). If it is determined that no access right is provided, the operation terminates (S3). If it is determined that the access right is provided, the memory chip performs an operation corresponding to the command for the memory cell at a specified address (S4).

Specifically, at step S4, a read operation reads data from the data register, outputs the data from the input/output terminal I/O according to the serial clock SC, and then terminates normally. A write operation temporarily stores data in the data register according to the serial clock SC, writes the data to the memory cell, and then terminates normally. A erase operation inputs a command to start erasing data from the memory cell, erases the data, and then terminates normally.

There are several methods of terminating the operation when an input command cannot be executed because of an illegal authentication result. For example, one method is to continue a dummy operation showing as if the normal operation were continuing outwardly. Another example is to terminate the operation abnormally by generating an error signal.

FIG. 9 (B) shows the access right check operation at step S2 in FIG. 9 (A). It is determined whether or not the access right is limited for the specified address (S1). If the access right is not limited, the check operation terminates assuming that the access right is provided (S5). When the area is access-limited, the input authentication key is compared with the stored authentication key (S2). If the authentication key is determined to be legal, the check operation terminates assuming that the access right is provided (S5) Even if the authentication is unsuccessful, the present invention can permit only a specified operation. If the authentication key is not determined to be legal, the memory chip checks whether or not the requested access (read, write, erase, etc.) is permitted (S3). When the access is determined to be permitted, the check operation terminates assuming that the access right is provided (S5). Otherwise, the check operation terminates assuming that the access right is not provided (S4).

The authentication operation according to the present invention will now be described with reference to FIGS. 2 through 6.

Figure 2:
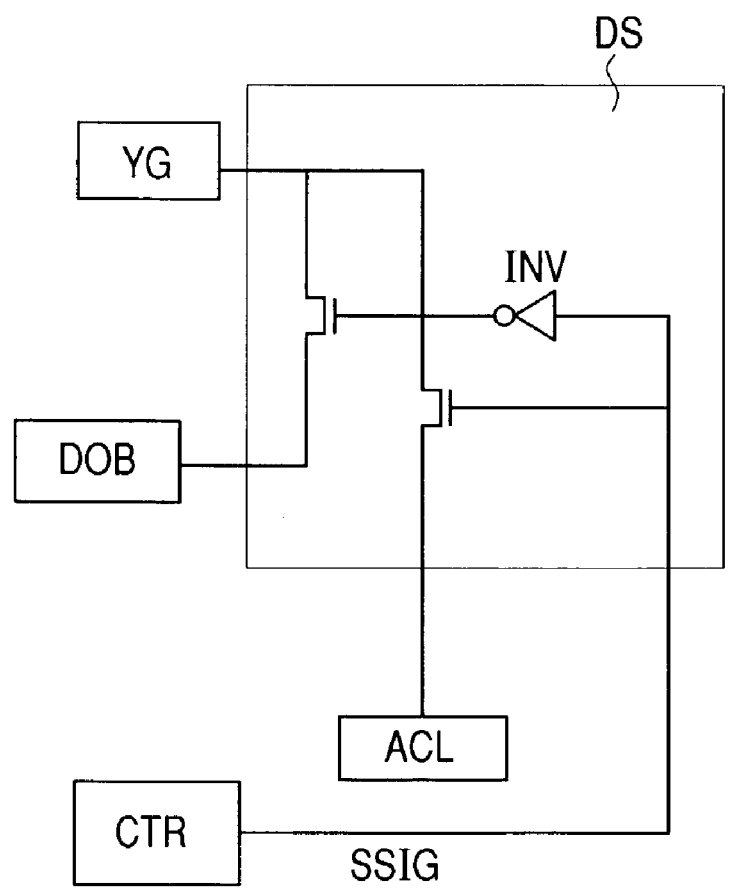
FIG. 2 shows a configuration example of a data selection circuit according to the present invention.

FIG. 2 exemplifies a configuration of the data selection unit DS. The data selection unit DS switches an output from the memory array AR. Namely, when the memory array AR outputs a signal, the data selection unit DS outputs the data to the data output buffer circuit DOB. When the memory array AR outputs access limitation information, the data selection unit DS outputs the information to the access right check circuit ACL. The Y gate YG inputs a signal to the data selection unit DS. A transfer MOS switch receives a control signal SSIG from the control unit CTR. The transfer MOS switch provides control to output a signal from an output unit connecting to the data output buffer circuit DOB or the access right check circuit ACL. This function is implemented by the complementary relationship of a signal that controls the transfer MOS switch.

Figure 3:
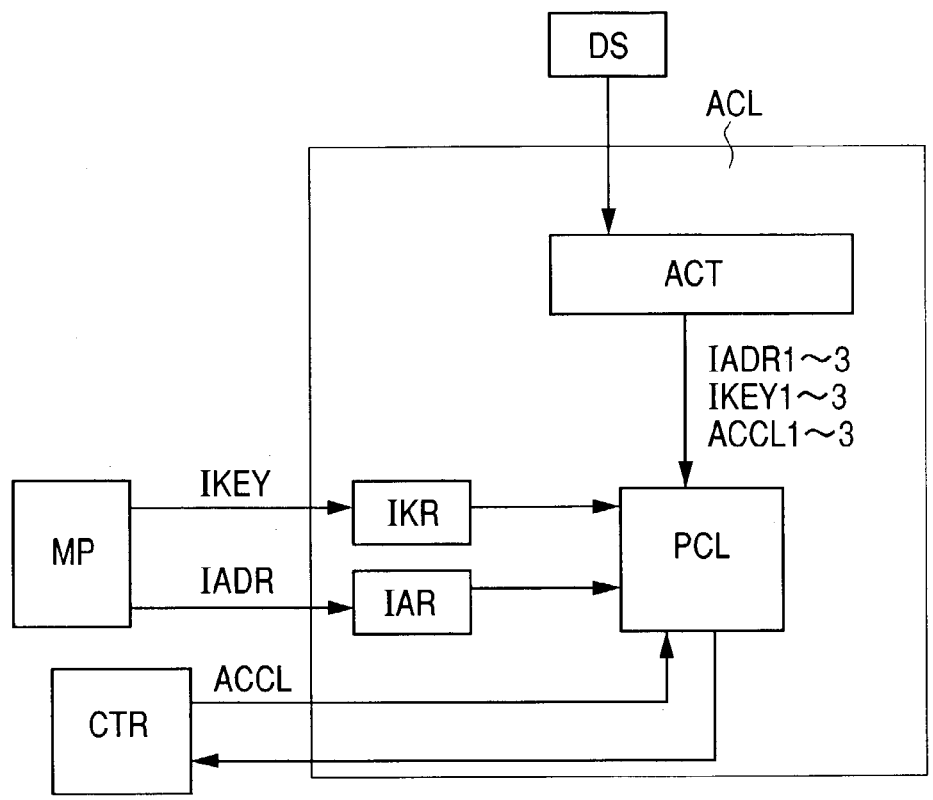
FIG. 3A shows an access right check circuit according to the present invention.
FIG. 3B shows information stored in an access check information storing unit.

FIG. 3 (A) exemplifies a configuration of the access right check circuit ACL. According to this configuration example, the access right check circuit ACL comprises an input authentication key register IKR, an input address register IAR, an authentication key check unit PCL, and an access limitation information storage unit ACT. The input authentication key register IKR works as temporary memory that temporarily stores an input authentication key IKEY supplied from the outside. The input address register IAR works as temporary memory that temporarily stores input address information IADR, i.e., address information supplied from the outside. The authentication key check unit PCL is a circuit that checks rightness of the input authentication key according to, e.g., the contents of the input authentication key register IKR, the input address register IAR, and the access limitation information storage unit ACT to be described, a requested access ACCL, i.e., information indicating an access requested from the outside, an internal control signal from the control unit CTR, etc. The access limitation information storage unit ACT works as temporary memory that temporarily stores information stored in the memory chip out of the above-mentioned information about rightness check of the input authentication key.

The data register reads the access limitation information from the memory array at a specified timing, such as when the power is supplied or reset, or data is accessed. The access limitation information is transferred from the data register via the data selection unit DS and is stored in the access limitation information storage unit ACT. Specifically, the access limitation information storage unit ACT is volatile memory (SRAM in many cases) mixedly mounted on a flash memory chip or a controller. Reading the information in a lump can decrease an overhead for the authentication, while the nonvolatile memory generally requires considerable time for reading. A location (address) in the memory array for storing the access limitation information may be predetermined by firmware (e.g., stored in the ROM) for controlling memory operations or be specifiable by an external signal.

The input address register IAR can be also configured to be partly or entirely shared with the X address buffer circuit XAB or the Y address counter circuit YAC, for example.

FIG. 3 (B) exemplifies the access limitation information temporarily stored in the access limitation information storage unit ACT. An embodiment of the present invention predefines the maximum number of areas (n) capable of specifying the access limitation information. The access right can be specified for each area i ($1=i=n$). The present example is configured to be able to specify three areas. The access limitation information is registered to each area. Address information (SADD1 to SADD3) defines a range of each area. The address information (SADD1 to SADD3) can provide forms of specifying information about the area's first address and length, specifying the area's first address and last address, and the like. The example in FIG. 10 (A) specifies an area using its first address and length. A stored authentication key (SKEY1 to SKEY3) is specified for each area. Permitted accesses (ACCL1 to ACCL3) provide information showing allowable access modes even if the input authentication key is invalid for each area, i.e., the input authentication key differs from the stored authentication key SKEY as described in FIG. 9 (B).

Figure 4:
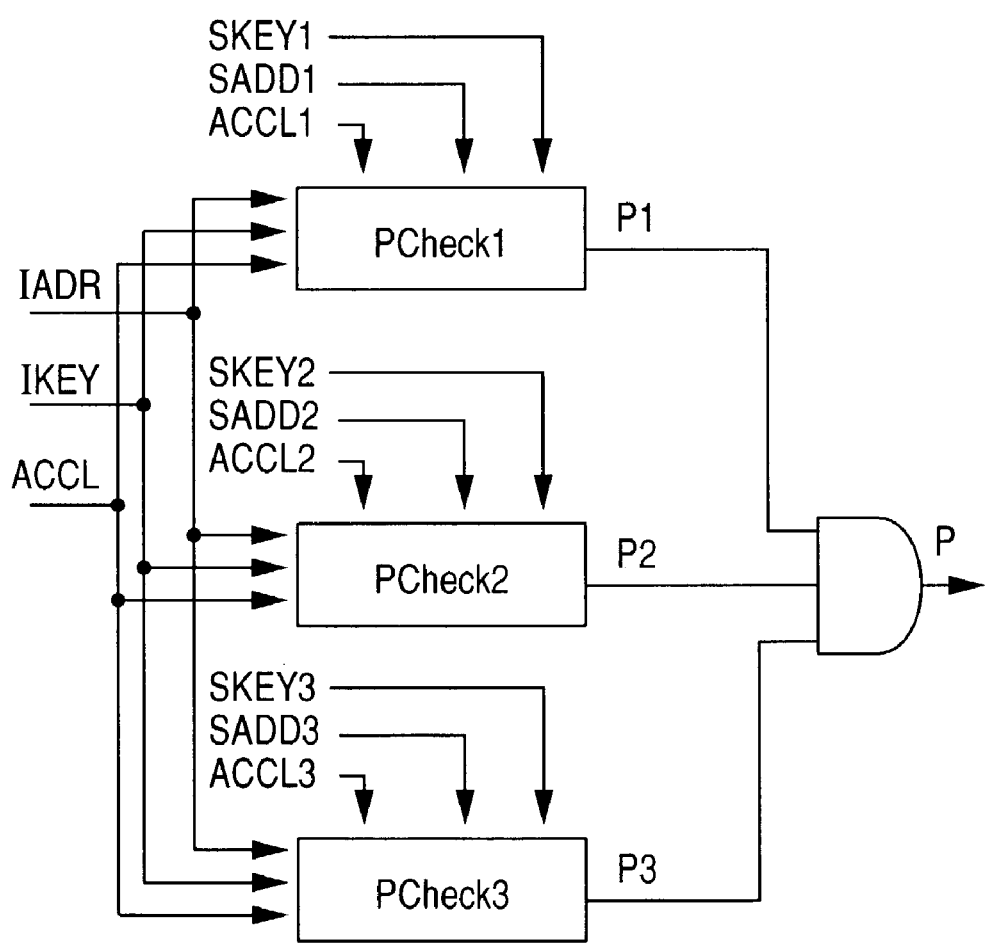
FIG. 4 shows a configuration example of an authentication key check unit according to the present invention.

FIG. 4 exemplifies a configuration of the authentication key check unit PCL. Based on the access limitation information, the authentication key check unit PCL checks whether or not an access request is permitted for the flash memory as shown in FIG. 9. When the access request is not permitted, the authentication key check unit PCL inhibits execution of the access. While an access request may be collated with the access limitation information for each area, the present configuration example performs this process in parallel for increasing the processing speed. Access check circuits PCheck1 to PCheck3 correspond to areas 1 to 3, respectively, and receive the access limitation information, the input address information IADR, an input authentication key JKEY, and the requested access ACCL as inputs. The access check circuit PCheck outputs 1 when permitting an access requested as any of signals P1 through P3 from the outside and outputs 0 otherwise. When the access request is not permitted for any of the areas, the access request should be inhibited. As a signal P, the authentication key check unit PCL outputs a logical multiplication of the signals P1 through P3 from the corresponding access check circuits PCheck.

Figure 5A:
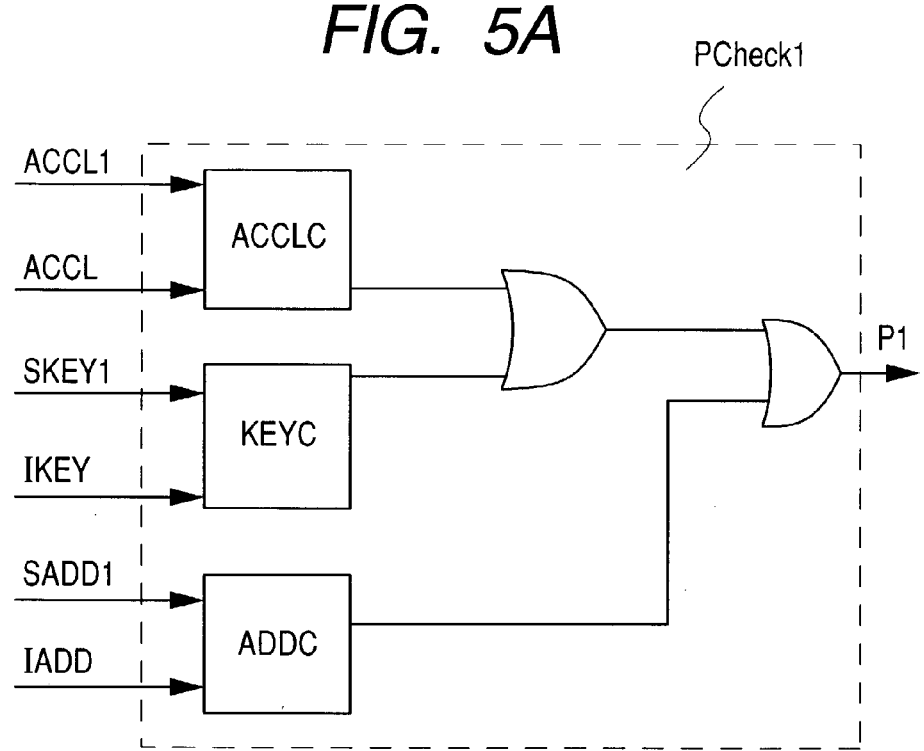
FIG. 5A shows an access check circuit for each area according to the present invention.
Figure 5B:
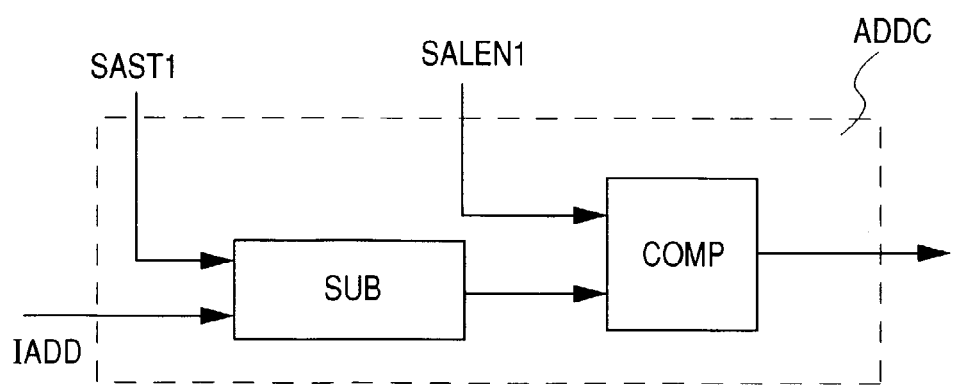
FIG. 5B shows a configuration example of an address check unit.

FIG. 5 (A) exemplifies a configuration of the access check circuit PCheck1 corresponding to the area 1. The same configuration applies to the remaining access check circuits for the other areas. The access check circuit PCheck comprises an access level check unit ACCLC, an authentication key comparison unit KEYC, an address check unit ADDC, etc.

Figures 6A, 6B, 6C:
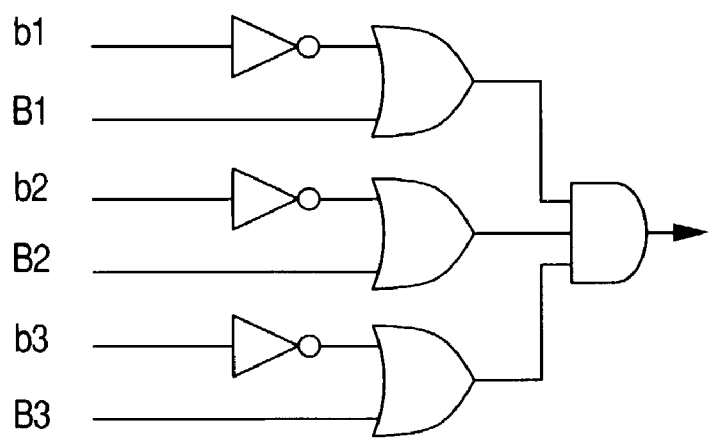
FIGS. 6A and 6B exemplify permitted access codes and requested access codes, respectively.
FIG. 6C shows a configuration example of an access level check unit according to the present invention.

The access level check unit ACCLC will now be described. A permitted access 1 (ACCL1) is represented in a 3-bit code as shown in FIG. 6 (A). For example, ACCL1=000 permits no access when no authentication is made. A permitted access is limited to reading when ACCL1=001; to reading and writing when ACCL1=011; to erasing when ACCL1=100; and to erasing and reading when ACCL1=101. ACCL1=111 permits all accesses. Here, "writing" is defined to be a write operation without erasing.

The requested access ACCL is also represented in a 3-bit code as shown in FIG. 6 (B). For example, ACCL=001 specifies a read request; ACCL=100 a erase request; ACCL=011 a write request; and ACCL=111 a rewriting request. Here, rewriting is defined to be an access operation with an erase operation.

The access level check unit ACCLC compares three bits B1, B2, and B3 of the permitted access 1 (ACCL1) with three bits b1, b2, and b3 of the requested access ACCL. The access level check unit ACCLC outputs 1 if the requested access is permitted; 0 otherwise. FIG. 6 (C) shows a configuration example.

The authentication key comparison unit KEYC compares the input authentication key IKEY with the stored authentication key 1 (SKEYL) for authentication. The authentication key comparison unit KEYC outputs 1 if both keys match; 0 otherwise.

FIG. 5 (B) shows a configuration example of the address check unit ADDC. The address check unit ADDC is configured to output 0 when an input address IADD indicates an address within the area 1 or to output 1 when the input address IADD indicates an address outside the area 1. Address information 1 (SADD1) comprises a first address SAST1 of the area 1 and a length SALEN1 thereof. A subtraction circuit SUB subtracts SAST1 from the input address IADD. A comparator circuit COMP compares an output from the subtraction circuit SUB with SALEN1, and outputs 1 when SALEN1 is smaller than the output; 0 otherwise. When the subtraction circuit SUB yields a negative subtraction result, however, the address check unit ADDC needs to be configured to use, e.g., a maximum value so that the succeeding comparator circuit COMP always outputs 1. As a method of representing an address, for example, the X and Y addresses may be combined to indicate a higher order with the X address and a lower order with the Y address.

The access check circuit PCheck1 according to the configuration in FIG. 5 (A) first ORs an output from the access level check unit ACCLC with an output from the key comparison unit KEYC. The access check circuit PCheck1 then ORs this logical addition with an output from the address check unit ADDC. And, the access check circuit Pcheck1 outputs the logical addition result as a signal P1.

As shown in FIG. 3 (B), the embodiment specifies one authentication key for one area, but the present invention is not limited thereto. A plurality of authentication keys may be specified for one area. In this case, for example, when an access from the outside satisfies a given relationship with any of authentication keys specified for the area, that access may be assumed to be legal and be permitted. It may be preferable to disallow any access with an illegal input authentication key. Alternatively, an access limitation may be provided by limiting types of permitted accesses even if each authentication key is determined to be legal. For example, one area can be separately assigned with a first authentication key for full access and a second authentication key for read only.

In this case, for example, the embodiment is configured so that setting the first authentication key for full access automatically sets the second authentication key for read only that has a given relationship (e.g., an open key and a secret key for public key cipher) with the first authentication key. Even if a third party gets to know the second authentication key, he or she cannot specify information having the second authentication key without knowing the first authentication key. It is possible to prevent information manipulation by the third party who does not know the first authentication key.

When the authentication uses the first authentication key for full access, it may be preferable to request the authentication using the second authentication key for read only in addition to the authentication using the first authentication key. When authentication keys have a hierarchical structure, it is possible to provide an access limitation by varying severity of the authentication according to access types. When the first authentication key is defined for one area and the second authentication key is defined for another, these areas may be completely the same. Further, one area may include the other. Moreover, one area may overlap the other, and only an overlapping portion may contain a plurality of keys.

The embodiment does not change the permitted access to an area that stores data even when an erase or write operation changes the data. However, the present invention is not limited thereto. For example, the embodiment may be configured to erase information in units of areas at a time and also erase the stored authentication key.

The above-mentioned configuration can provide the flash memory that has a plurality of areas assigned with different authentication keys and is capable of redefining the authentication keys and areas.

Second Embodiment

The second embodiment of the present invention will now be described. The embodiment specifies the stored authentication key SKEY for each read unit. A specified address for the read unit is fixed to be an address for storing the stored authentication key, thus decreasing an authentication overhead.

Figure 11:
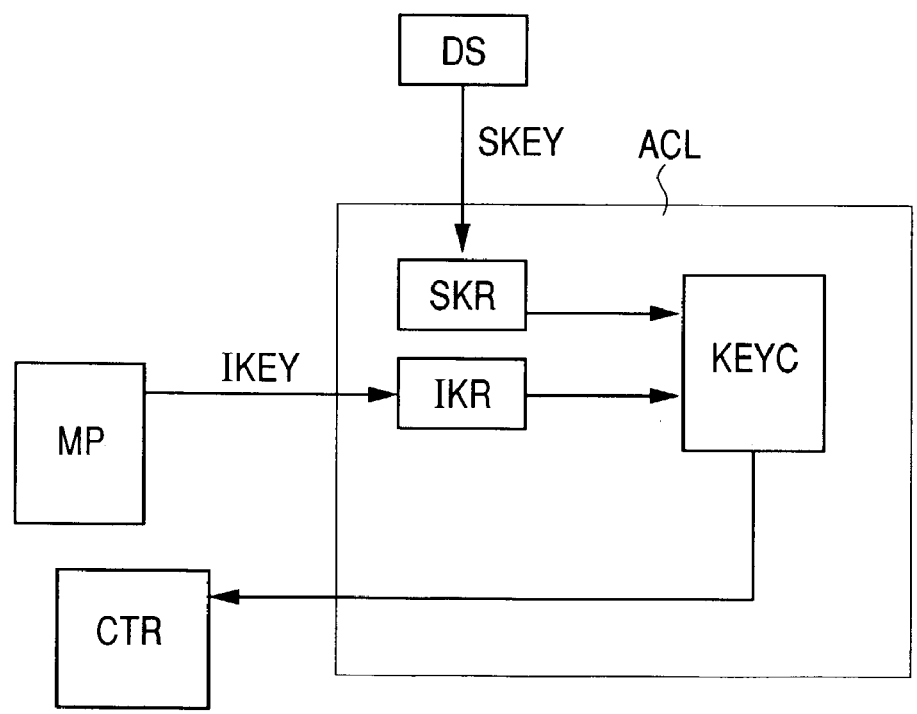
FIG. 11 shows an configuration example of the access right check circuit according to the present invention.

FIG. 11 shows the access right check circuit ACL according to the embodiment. This example reads data on the basis of a sector (a set of memory cells having the same X address). The data selection unit DS extracts the stored authentication key SKEY from one-sector read data and stores that key in a stored authentication key register SKR. The input authentication key IKEY input from the outside is temporarily stored in the input authentication key register IKR. The authentication key comparison unit KEYC compares the contents of the stored authentication key register SKR with those of the input authentication key register IKR to check if they match. According to this configuration, the stored authentication key SKEY is transferred to the access right check circuit ACL via the data selection unit DS each time the X address is specified during a data access.

The configuration can specify the authentication key for each X address that is a unit of one-time reading. The authentication key is read into the data register simultaneously with the accessed information, providing the flash memory with decreased overhead for the authentication and the circuit scale for authentication.

The embodiment can also implement external operations for data access in the same manner as shown in FIG. 7 and FIGS. 8 (A) and 8 (B). Memory chip operations for reading, writing, and erasing are the same as those for the examples in FIG. 9. During a read operation, however, a sector except the stored authentication key is output to the data output buffer circuit DOB.

Figure 12:
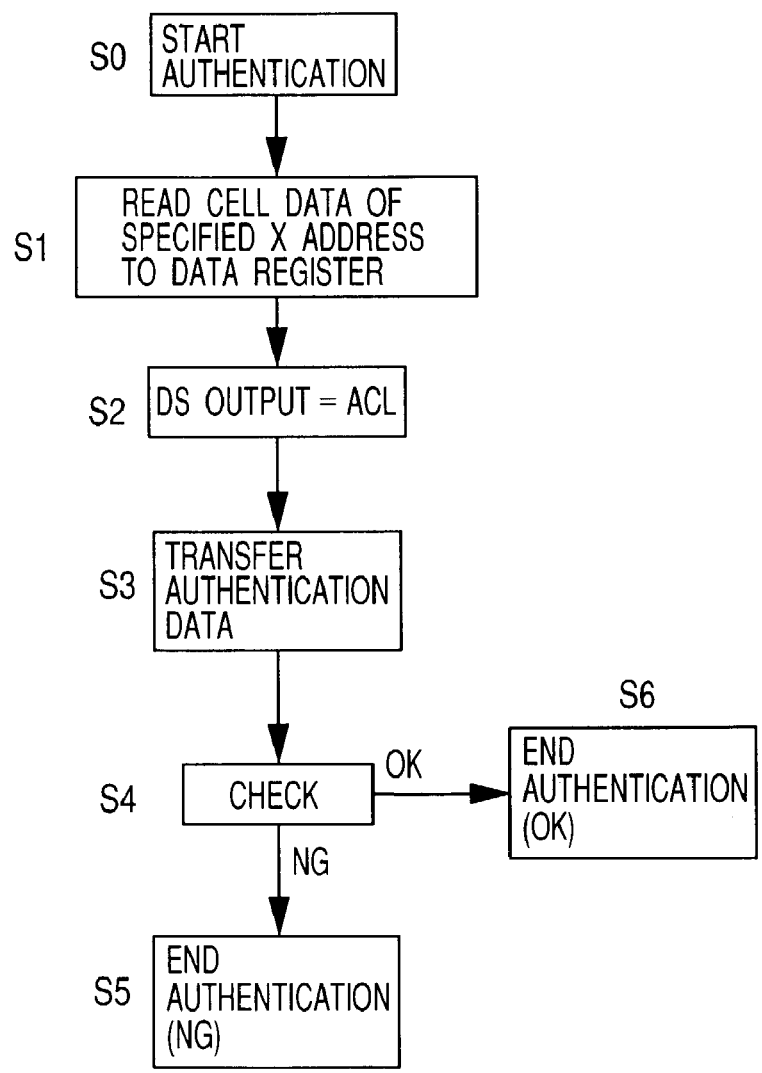
FIG. 12 is a flowchart showing an access right check operation in the nonvolatile semiconductor memory according to the present invention.

FIG. 12 shows an access right check operation according to the embodiment. A data access reads data for a memory cell (data for one sector) having the same X address as an externally specified address out to the data register at a time. The access right check circuit ACL is specified as a destination of the data selection unit DS (S2). The data used for the authentication is transferred to the access right check circuit ACL from the data register. Based on the authentication-related data transferred from the data register and input from the outside, the access right check circuit ACL determines whether or not to permit the requested access (S4). The operation then terminates (S5 and S6). In order to decrease overhead for the access right check operation, the embodiment does not provide the access contents that are permitted when the authentication is unsuccessful.

Figure 13:
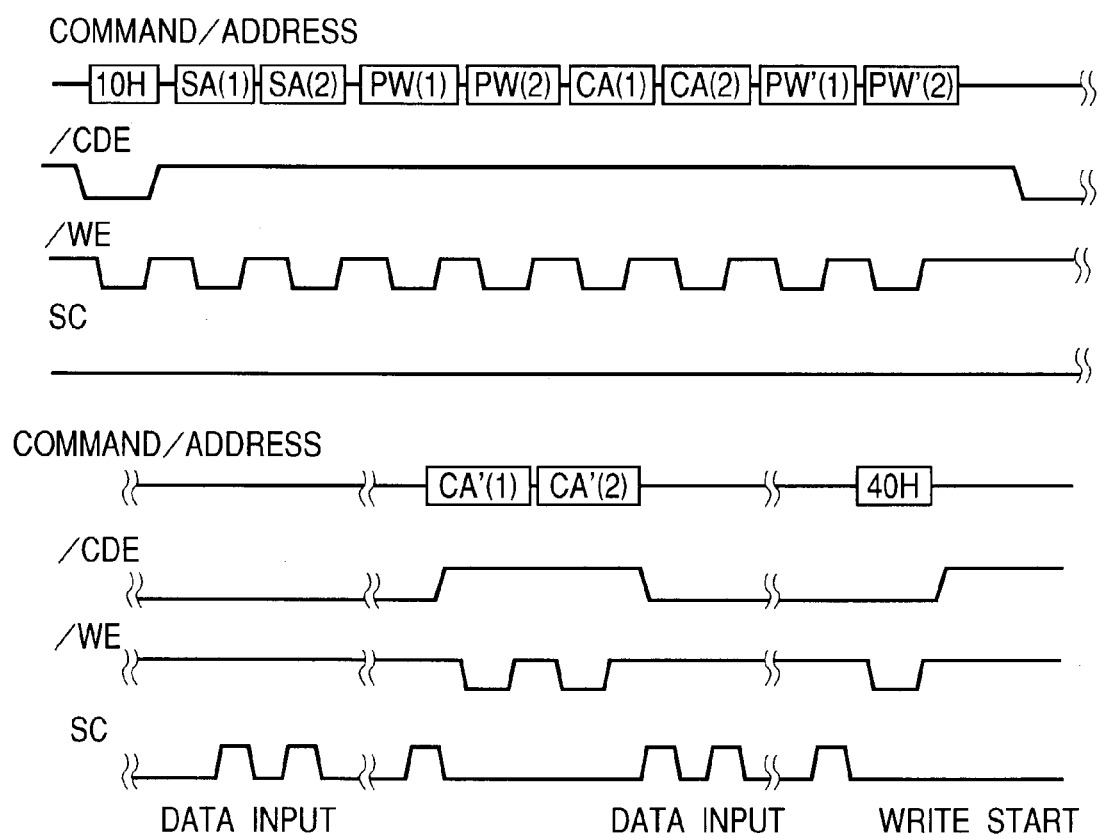
FIG. 13 is a timing chart showing a procedure of write accesses together with an authentication key change in the nonvolatile semiconductor memory according to the present invention.

The following describes a procedure for access limitation according to the second embodiment with reference to an example of signal input operation from the outside in FIG. 13. FIG. 13 shows a write operation including a change of the already defined authentication keys PW(1) and PW(2) to new authentication keys PW* (1) and PW* (2). Also in this example, the serial clock SC is stopped before input of command "40H". The Y address is newly input as CA'(1) and CA'(2) in two blocks. The serial clock SC is then driven and write data is input. In this manner, the data register can temporarily store the write data from the newly input Y address. Inputting command "40H" writes the data temporarily stored in the data register to the memory cell.

When data is written to a sector where no authentication key is specified, it is unnecessary to input the original authentication keys PW(1) and PW(2). When no authentication key is specified, a given mark (e.g., all 0s) should be stored at a specified address for the stored authentication key to indicate that the necessary authentication key is not defined.

When the authentication key is not changed, it is unnecessary to input the new authentication keys PW*(1) and PW* (2). A different write command may be provided to identify these keys.

The read and erase operations are the same as those shown in FIGS. 7 and 8 (B). During erasing, however, erasing user data may also erase the authentication data. This can be solved by permitting any access at the X address in the erase state or saving the authentication data before erasing and rewriting it after erasing.

While the embodiment determines rightness of the input authentication key IKEY by checking if it matches the stored authentication key SKEY, the present invention is not limited thereto. Various check methods are available by changing the function of the authentication key comparison unit KEYC, for example.

The embodiment is configured to inhibit an access when an authentication result determines that the input authentication key IKEY is illegal. However, the same operations as in the first embodiment are feasible, for example, by adding a circuit as shown in the first embodiment for checking a permitted access to the access right check circuit ACL and storing information about the permitted access also as authentication-related data in the memory array.

Further, the embodiment performs authentication for each data having the same X address. The embodiment can be expanded to a configuration so that a plurality of X addresses is used as a unit or the same X address contains a plurality of authentication units.

Third Embodiment

Figure 14:
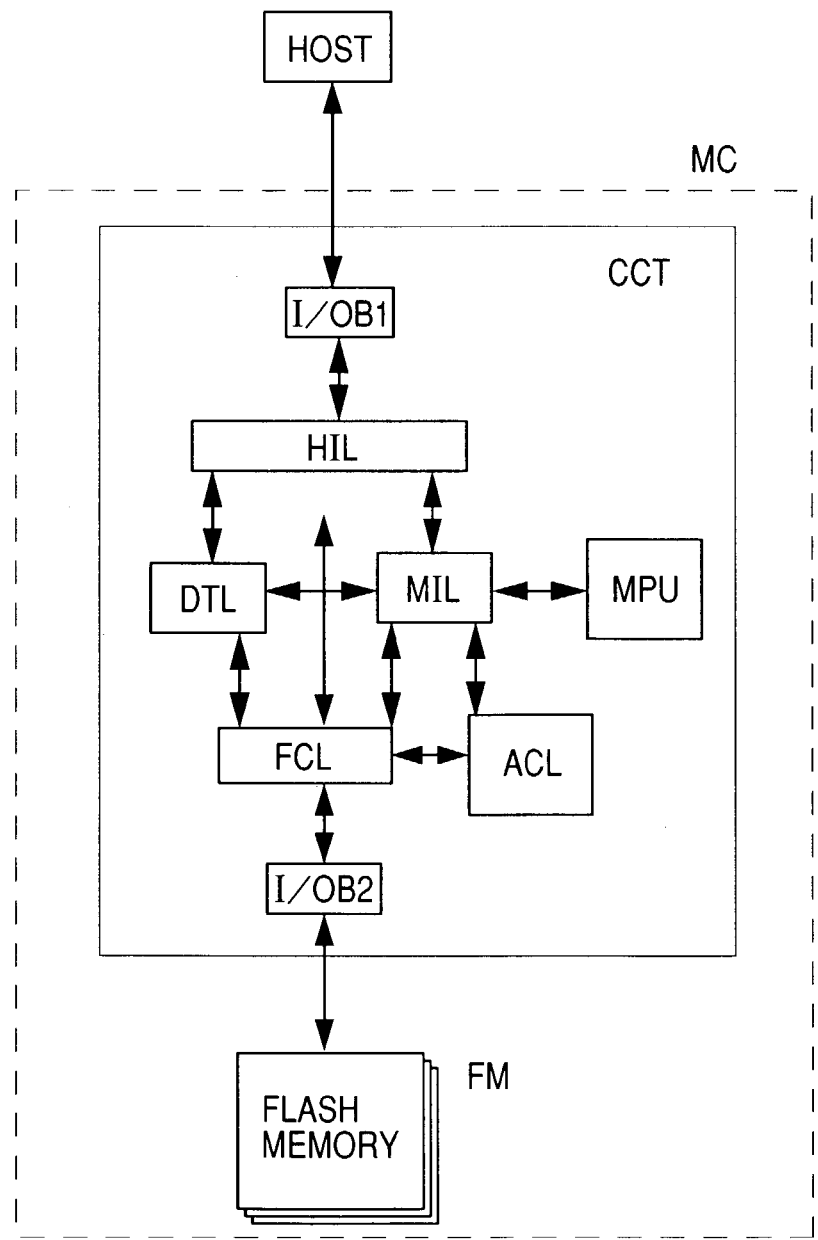
FIG. 14 is a block diagram showing an example of a memory card according to the present invention.

FIG. 14 shows a block diagram of the memory card according to the third embodiment of the present invention. In FIG. 14, a memory card MC comprises a card controller CCT and a plurality of flash memory chips FM. The card controller CCT comprises an input/output buffer I/OB1 for an external host interface; an input/output buffer I/OB2 for an interface with the flash memory in the memory card; a host interface logic circuit HIL to control the host interface; a flash memory control logic circuit FCL to control the flash memory; a data transfer control logic circuit DTL to control data transfer; an MPU; an MPU interface logic circuit MIL; the access right check circuit ACL, etc.

Figure 15:
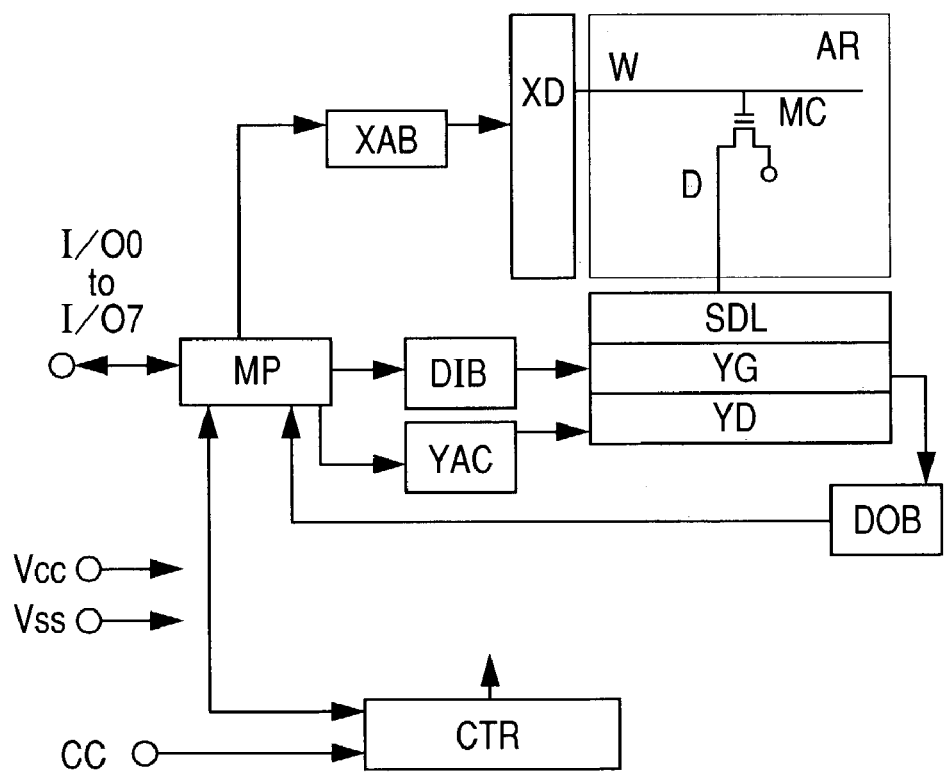
FIG. 15 is a block diagram showing an example of a conventional nonvolatile semiconductor memory.

Specially, the embodiment provides authentication as a memory card having the portion for processing authentication-related operations externally to the flash memory chip. For example, it is possible to use a flash memory chip having no authentication function as shown in FIG. 15. The access right check circuit ACL can be configured to a circuit having the function equivalent to that of the circuit as described in the first or second embodiment. The information protection function can be provided as a memory card.

In this case, a general-purpose flash memory chip can be used, adding an advantage of providing a memory card at a lower cost.

The following describes an example of using a flash memory chip, a memory card, etc. that can protect stored information against an illegal access.

Fourth Embodiment

Figure 16:
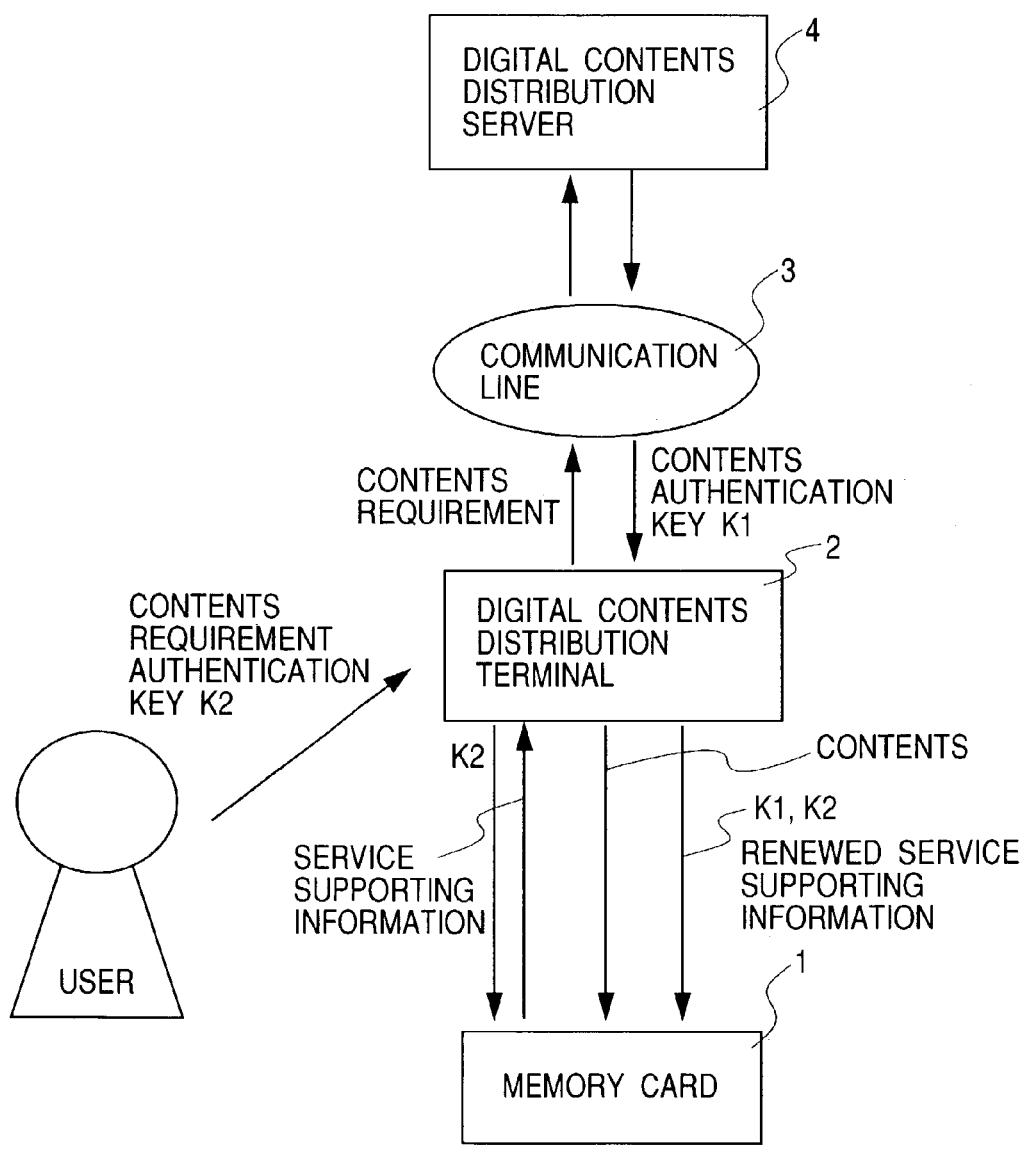
FIG. 16 is a block diagram showing an example of an information distribution system according to the present invention.

FIG. 16 is a block diagram of an information distribution system that provides digital information (digital contents) in response to a user's (customer's) request. The system distributes digital information such as music and video information via a memory card using the flash memory according to the first or second embodiment or via the a memory card 1 equivalent to the memory card MC exemplified in the third embodiment. A digital contents distribution terminal 2 is installed at a railroad station, a convenience store, etc. The digital contents distribution terminal 2 transmits a user's request for contents to a digital contents distribution server 4 and performs a necessary procedure for service supporting information stored in the memory card 1. The digital contents distribution server 4 stores digital contents and transmits digital information in response to a contents request from the digital contents distribution terminal via a communication line 3. The communication line 3 may be a telephone line, the Internet, a satellite communication line, a leased line, etc. The information may be distributed in the forms of, e.g., selling, rental, free distribution, etc.

The service supporting information is individual customer's information needed for an information service distribution company (hereafter referred to as a service provider). The service supporting information is stored in the memory card 1. The service supporting information includes (1) information for improving the customer's usability; (2) information for protecting the digital contents' copy right; and (3) charging information for purchasing contents. The information for improving the customer's usability includes a sales history about a customer. The customer's sales history is stored in the memory card. According to this sales history, the digital contents distribution terminal 2 edits and displays a distributable contents list. This makes it possible to efficiently provide contents according to customer's preferences. The rental service includes information about a rental period. From the viewpoint of copyright protection for contents, digital contents to be distributed can contain an electric watermark as the service supporting information based on the customer's specific information stored in the memory card 1. Since this service supporting information is stored in the memory card 1 of each customer, not exclusively managed by the service provider, the customer's privacy can be protected efficiently.

Figure 17A:
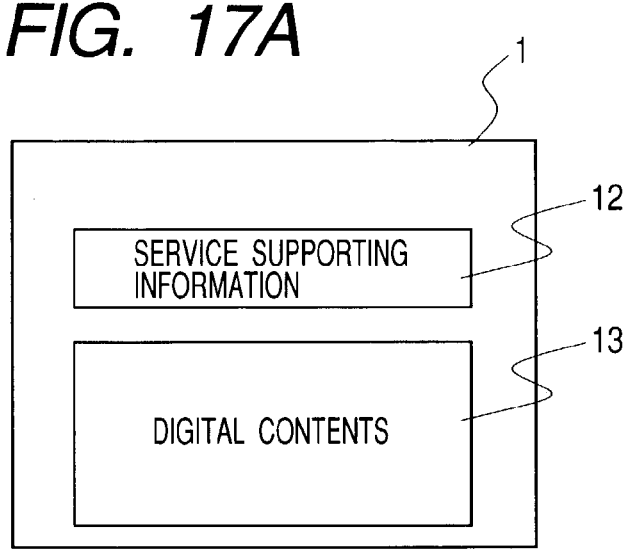
FIG. 17A illustrates information stored in the memory card used for an example of the information distribution system according to the present invention.
Figure 17B:
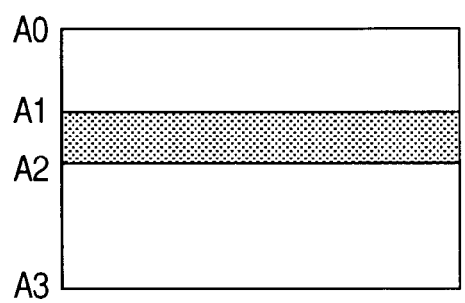
FIG. 17B illustrates information stored in a service supporting information storage area.

The information distribution system in FIG. 16 provides information by writing digital information in the memory card. The contents stored in the memory card 1 include service supporting information 12 and digital contents 13 as shown in FIG. 17 (A). The information distribution system needs to protect the service supporting information stored in the memory card 1 against manipulation by a customer or a third party and to prevent the memory card from being used illegally.

Only a provider is allowed to write the service supporting information (the access limitation information oriented for providers). This information includes not only management information common to a plurality of customers, but also customer-specific information such as charging information (the access limitation information oriented for providers and users). Since the latter information needs to have a higher security level than the former, the access limitation is provided as shown in FIG. 17 (B).

The service supporting information is stored in an area (hereafter referred to as a provider area) indicated by addresses A0 to A3. The provider area is given the access limitation with an authentication key K1 specified by the provider. Only a read operation is allowed for those who do not know the authentication key K1 except the provider. The provider area contains an area (hereafter referred to as a provider-user area) indicated by addresses A1 and A2. The provider-user area is given the access limitation with a user-specified authentication key K2. No access is allowed for those who do not know the authentication key.

The provider-user area is used to write user-specific information such as charging information and history information, for example. The provider area except the provider-user area contains information such as an identification number and the like supplied to each user from the provider. After the access limitation is provided as mentioned above, these areas are managed as follows.

(1) Provider-user area: A write operation requires both a provider authentication key and a user authentication key. A read operation requires the user authentication key. No access is allowed for those who do not know the user authentication key.

(2) Provider area except the provider-user area: A write operation requires the provider authentication key. A read operation is available for even those who do not know the provider authentication key. The user authentication key may or may not be used.

When two authentication keys are used to limit access to one area as mentioned above, the authentication key comparison unit KEYC in FIG. 5 (A) is configured as follows. It is assumed that the provider-specified stored authentication key K1 and the user-specified stored authentication key K2 each comprise n-bit information. The input authentication key is configured to be 2n-bit information comprising a provider's authentication key and a user's authentication key input to the digital contents distribution terminal 2. The provider's authentication key is stored in the digital contents distribution terminal 2 or is transmitted to the digital contents distribution terminal 2 from the digital contents distribution server 4 via the communication line 3. The authentication key comparison unit KEYC compares the n-bit stored authentication key defined for each area with the 2n-bit input authentication key. The authentication key comparison unit KEYC may be configured to output 1 when the stored authentication key matches the high-order or low-order n bits in the input authentication key or output 0 when the stored authentication key matches neither of these bits.

In order to write information to the area 2, for example, PCheck1 to PCheck3 of the authentication key check unit in FIG. 4 must all output is. Here, the stored authentication key K1 must be known in order to output 1 from PCheck1. The stored authentication key K2 must be known in order to output 1 from PCheck2. Accordingly, the write operation requires both the authentication keys K1 and K2. To read information from the area 2, PCheck1 outputs 1 independently of the input authentication key because reading is a permitted access. It just needs to know the stored authentication key K2 so as to output 1 from PCheck2.

When the present example is implemented by using the memory card equipped with the flash memory according to the second embodiment, for example, the high-order n bits of the authentication key are used for the provider authentication key and the low-order n bits thereof are used for the user authentication key. The authentication key comparison unit KEYC in FIG. 11 maybe configured to generate a signal indicating that any access is permitted when the input authentication key matches both the high-order and low-order n bits and that only reading is permitted when the input authentication key matches only the low-order n bits.

Fifth Embodiment

Figure 18:
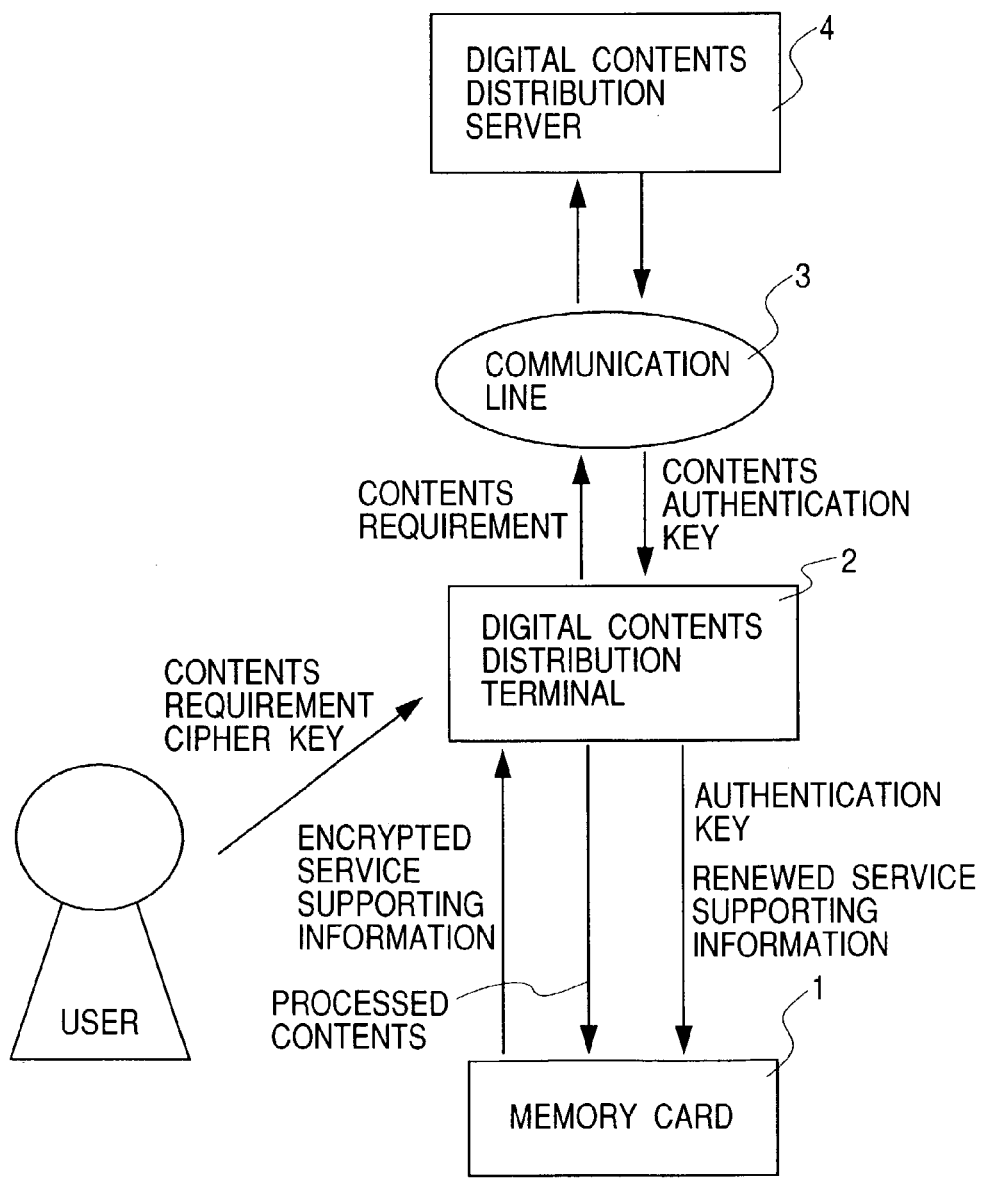
FIG. 18 is a block diagram showing an example of the information distribution system according to the present invention.

While the authentication key is used for access limitation up to the fourth embodiment, FIG. 18 shows an example of using a cipher key for access limitation.

According to the present embodiment, as shown in FIG. 19 (B), an area storing the service supporting information is provided with the access limitation using the authentication key based on the memory card function. The service provider manages this authentication key by storing it in the digital contents distribution terminal 2. The cipher key managed by a user (customer) is used to encrypt at least part of the service supporting information to be stored. For example, this part of the information is equivalent to the charging information, the history information, or the service supporting information stored in the provider-user area according to the fourth embodiment. Namely, the digital contents distribution terminal 2 can use its own authentication key to write the service supporting information area. By contrast, the digital contents distribution terminal encrypts specific service supporting information to write it to the memory card 1. This method can prevent others than the service provider from writing the service supporting information and can protect the service supporting information against manipulation by others than the service provider. Since the service supporting information is encrypted with the cipher key identified only by a card owner, it is possible to prevent an illegal use of the memory card by a third party. The access limitation on the service supporting information storage area permits only reading information without knowing the authentication key. In this case, a service is available in such a manner that a rental period is read into the playback equipment and, if the rental period exceeds a preset value, there is provided a function of inhibiting playback of contents to prevent an illegal use of the service. The service supporting information requiring the duplicate access limitation mostly comprises information that is rewritten when the user uses a service. Consequently, the fifth embodiment that uses the cipher key provides easier management than the fourth embodiment that uses the user-specified authentication key for management.

Figure 20:
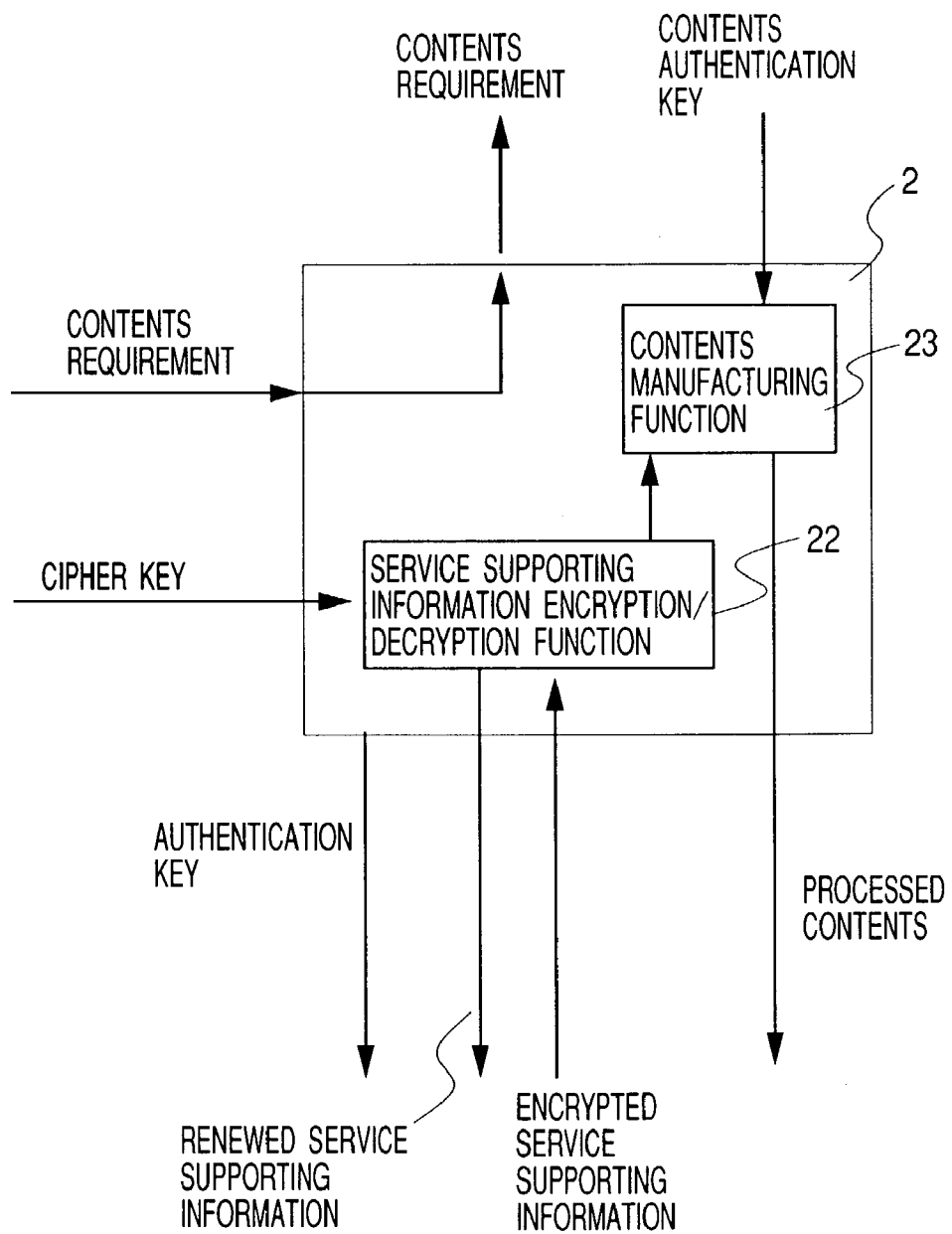
FIG. 20 shows a configuration example of a digital contents distribution terminal according to the present invention.

Further, the digital contents distribution terminal 2 can be configured to include a service supporting information decoding function 22 and a contents processing function 23 as shown in FIG. 20. Specifically, memory (not shown) in the terminal 2 stores programs to implement these functions. A CPU (not shown) for the terminal 2 reads and executes these programs.

In this case, an information distribution service takes place according to the following procedure.

(1) A user (customer) specifies contents to be distributed and inputs a cipher key for the service supporting information from the digital contents distribution terminal 2.

(2) The digital contents distribution terminal 2 requests the digital contents distribution server 4 to send the user-requested contents, reads the service supporting information from the memory card 1, and decrypts that information using the cipher key input by the customer.

(3) The digital contents distribution terminal 2 encrypts the contents sent from the digital contents distribution server 4 or supplies an electric watermark to the contents using the decrypted service supporting information. The digital contents distribution terminal 2 writes the processed contents, re-encrypts the updated service supporting information, and performs update writing using the authentication key. It is also possible to process contents on a server or the like, for example, by sending the service supporting information to the digital contents distribution server 4.

As shown in FIG. 19 (B), the present example employs a method of applying no access limitation to an area for storing digital contents and encrypting them. Further, for example, the user can provide the authentication key to the digital contents area for preventing writing and can protect digital contents against manipulation. Digital contents are available in various forms such as no encrypting, provision of an electric watermark, etc. The present invention is not limited to a specific method.

Moreover, the memory card can store a plurality of types of the service supporting information and digital contents as shown in FIG. 19 (C). In this case, if a common memory card is used for a plurality of providers, the memory card can maintain the service supporting information each service provider manages independently, making it possible to provide diverse services.

Sixth Embodiment

FIG. 21 is a block diagram exemplifying an information system that allows a plurality of users to used information in the memory card. Particularly, FIG. 21 depicts a medical system capable of storing information about a plurality of patients in a memory card 5.

FIG. 22 (A) shows contents stored in the memory card. Each hospital that writes information secures either or both of a secret information area and a public information area in the memory card. As shown in FIG. 22 (B), each hospital provides access limitation by assigning an authentication key to the areas the hospital secured and permits only reading to a third party. The hospital encrypts information to be stored in the secret information area.

When the memory card is configured as mentioned above, all the information can be protected against manipulation because the authentication key provides access limitation. Any organization can read information stored in the public information area that permits only reading to a third party. Third parties ignorant of the cipher key cannot know the contents of information stored in the secret information area. For example, it is possible to store information that must not be notified to a patient carelessly.

When the patient goes to a different hospital, it can examine the patient by referencing the patient's clinical history and other information stored in the public area of the patient's memory card. When more detailed information becomes necessary, the information in the secret information area can be decrypted by inquiring the cipher key for that area from the former hospital that recorded the information. The cipher key can be centrally managed in an organization comprising hospitals that use such memory card. This can save processes for inquiry about the cipher key.

INDUSTRIAL APPLICABILITY

The present invention can provide the information memory capable of protecting stored information against an illegal access by checking validity of the externally input authentication key.

In addition, it is possible to provide the information memory capable of setting a plurality of areas protected by different authentication keys and resetting the authentication keys and areas. Further, the present invention can provide the information distribution system using the memory card capable of preventing a third party's illegal use and manipulation of the stored information.

What is claimed is:

1. A nonvolatile semiconductor flash memory comprising:

a memory cell array containing a plurality of nonvolatile memory cells;

a decoder driver to select a nonvolatile memory cell addressed from the memory cell array; and an access control circuit supplied with an input command and an input address;

wherein the access control circuit compares access control information about an access control area limiting a specified access in the memory cell array with the input command and the input address supplied to the access control circuit, provides control to select a nonvolatile memory cell specified by the input address via the decoder driver when the input command and the input address do not comply with an access limited for an address control area, and provides control not to select a nonvolatile memory cell specified by the input address via the decoder driver when the input command and the input address comply with an access limited for the address control area;

the access control information includes address information about an access-limited area and a limited access mode;

information included in the access control information is specifiable by means of a command;

the access control information has a first key provided in correspondence with the access-limited area;

the access control circuit further compares the first key with an input key input together with the input command and the input address, provides control to select a nonvolatile memory cell specified by the input address via the decoder driver when the input key matches the first key or the input command and the input address do not comply with an access limited for the address control area, and provides control not to select a nonvolatile memory cell specified by the input address via the decoder driver when the input key does not match the first key and the input command and the input address comply with an access limited for the address control area;

the first key included in the access control information is specifiable by means of a command;

the access control information has a permitted access mode allowed when the input key does not match the first key; and the access control circuit provides control to select a nonvolatile memory cell specified by the input address via the decoder driver-even if the input key and the first key do not match and if the input command is included in the permitted access mode.

2. A nonvolatile semiconductor flash memory comprising:

a memory cell array containing a plurality of nonvolatile memory cells;

a decoder driver to select a nonvolatile memory cell addressed from the memory cell array; and an access control circuit supplied with an input command, an input address and an input key;

wherein a specified area in the memory cell array is an access limitation area limiting a specified access and stores access control information including an access mode limited for the access limitation area and a first key;

wherein the access control circuit compares the access control information with the input command, the input address and the input key, provides control to select a nonvolatile memory cell specified by the input address via the decoder driver when the input key matches the first key or the input command and the input address do not comply with an access limited for the address control area, and provides control not to select a nonvolatile memory cell specified by the input address via the decoder driver when the input key does not match the first key and the input command and the input address comply with an access limited for the address control area;

wherein the access limitation area stores data encrypted with a second key, wherein the access control information has a permitted access mode allowed when the input key does not match the first key; and wherein the access control circuit provides control to select a nonvolatile memory cell specified by the input address via the decoder driver even if the input key and the first key do not match and if the input command is included in the permitted access mode.

* * * * *